United States Patent [19]
Grasvoll

[11] 3,933,569
[45] Jan. 20, 1976

[54] TOOL FOR WELDING TOGETHER TWO PLASTICS FILMS WRAPPING AN OBJECT

[76] Inventor: Halvor Gråsvoll, Stigbergsliden 16, S-414 63 Göteborg, Sweden

[22] Filed: Mar. 18, 1974

[21] Appl. No.: 452,212

[30] Foreign Application Priority Data
Mar. 19, 1973 Sweden .............................. 7303772

[52] U.S. Cl. ................... 156/515; 156/583; 53/182
[51] Int. Cl.² ...................... B65B 9/12; B65B 51/30
[58] Field of Search ........... 53/182, 198 R; 156/583, 156/515, 251

[56] References Cited
UNITED STATES PATENTS

| | | | |
|---|---|---|---|
| 3,236,024 | 2/1966 | Bradley et al. | 53/198 R |
| 3,517,479 | 6/1970 | Pinkham | 53/182 |
| 3,596,434 | 8/1971 | Zelnick | 53/182 X |
| 3,672,116 | 6/1972 | Ingmarson | 53/198 R X |
| 3,690,090 | 9/1972 | Van deBilt | 53/198 R |
| 3,739,547 | 6/1973 | Brevko et al. | 53/182 |

*Primary Examiner*—Douglas J. Drummond
*Assistant Examiner*—M. G. Wityshyn
*Attorney, Agent, or Firm*—Harness, Dickey & Pierce

[57] ABSTRACT

A tool for interconnecting by means of welding two webs of a plastics film enclosing a package of goods, said tool comprising two sections arranged to be pressed against one another while securely holding and welding together said film webs and thereafter separate said webs from one another after welding. The tool comprises means arranged to tighten the film around the goods while maintaining the stretch of film web extending from the welding point towards the web supply rolls in a tension-free condition during the welding operation proper so as to ensure a high-quality and durable welding seam.

5 Claims, 5 Drawing Figures

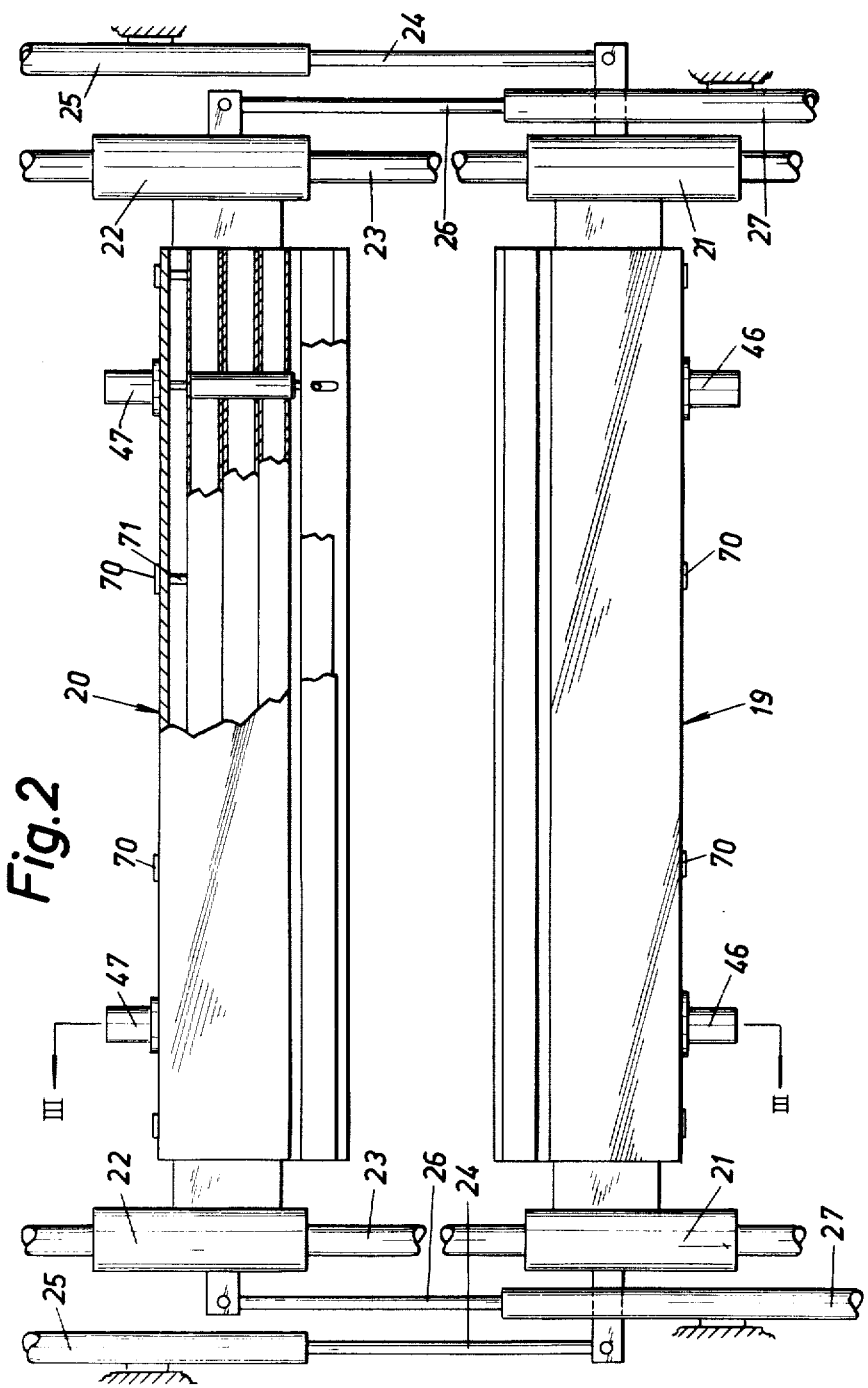

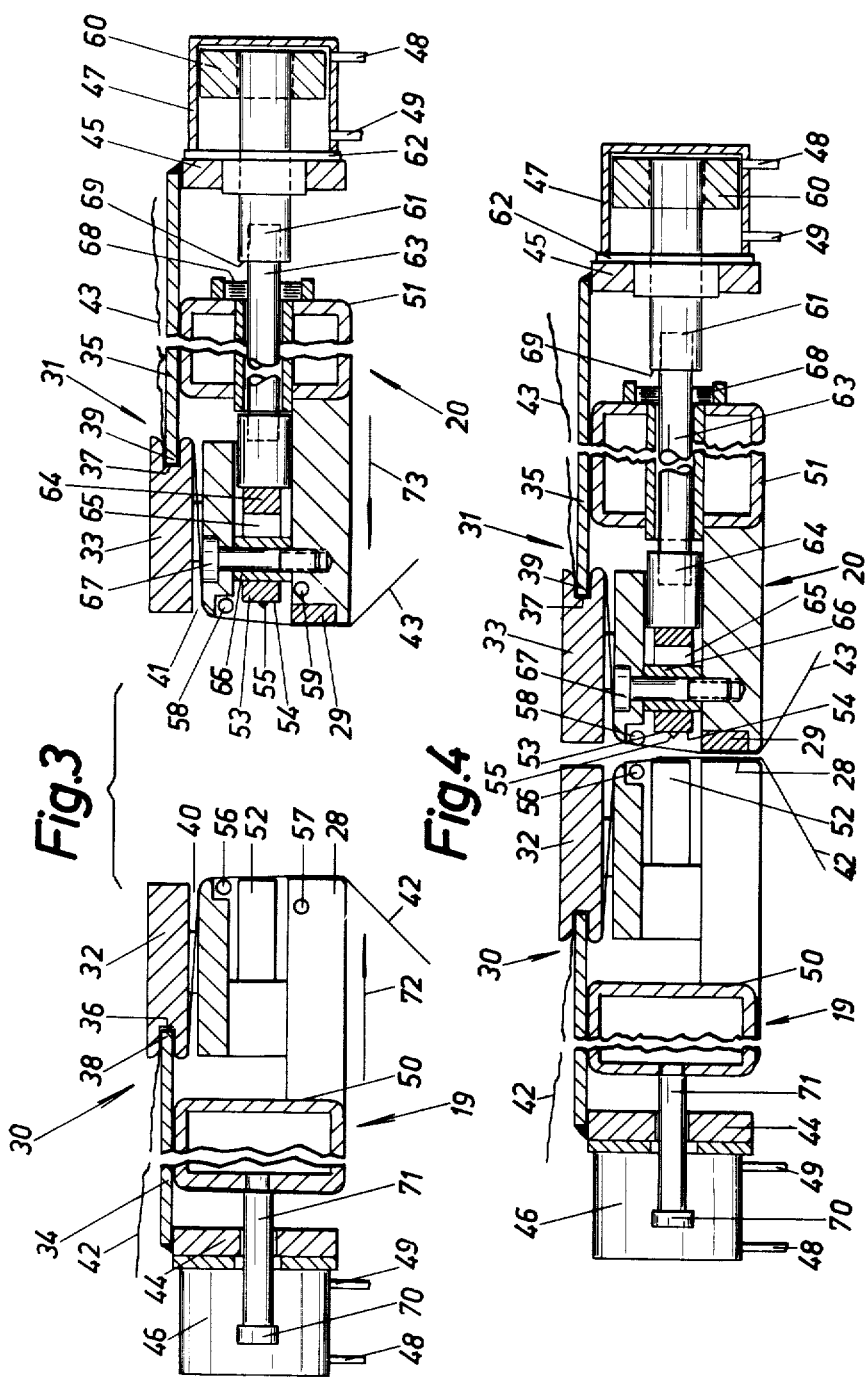

TOOL FOR WELDING TOGETHER TWO PLASTICS FILMS WRAPPING AN OBJECT

BACKGROUND OF THE INVENTION

It is already known to wrap packaging goods in film webs dispensed from two supply rolls, these film webs consisting of a material possessing such elasticity that the film may be stretched considerably without loosing its elastic properties. Once the objects have been wrapped in the film, the film webs are joined together along their entire width through welding and thereafter severed along the centre line of the welding joint. The film is made to enclose the goods while in a heavy tensioned condition both as a result of the goods pressing against the film to which a braking force is applied during its reel-off from the supply rolls whereby the film is brought to adhere against three of the four parallelepipedon sides of the goods and as a result of the interconnection of the two film webs at the fourth side while at the same time the film sides thus interconnected are locked relative to one another along a straight line. The tension of the film calculated from this line and towards the supply rolls may thereafter be released without ensuing reduction of the tension of the film already wrapped around the packaging goods. The film webs are united along an additional straight line positioned somewhat spaced from and in parallel with the first straight line and closer to the supply rolls and the film webs are locked along said second line, care being taken to keep the film areas intermediate these two lines free of tension. Two parallel durable welding joints can then be made between these two locking lines and the film be severed between the welding seams. In order to make it possible to wrap packaging goods in plastic films in this manner two means are required to brake the film webs as they are being reeled off from the supply rolls, and in addition an apparatus is required to push the goods forwards against the stretched film webs while overcoming the braking effect of said two brake means. Having urged the goods forwards, the pushing apparatus must return to its initial position in order to leave space for the clamping means and the welding and severing tool. It is then necessary to ensure that the tension in the film enclosing the goods does not cease. In addition, it is necessary to ensure that the braking effect exerted on the film webs as the latter are reeled off the supply rolls ceases immediately prior to the clamping means performing their function of interconnecting the two film webs in a flat condition opposite the welding and severing tool. Because of these numerous considerations a wrapping machine of the kind referred to becomes rather complicated.

SUMMARY OF THE PRESENT INVENTION

The primary object of the present invention is to remedy the above-mentioned drawbacks. The tool in accordance with the invention comprises in the conventional manner two tool halves or sections which may be pressed against one another each one of said tool sections being provided at the part thereof adjacent the goods with a clamping means and externally thereof, with relation to the goods, with two welding units and a severing means positioned intermediate said units.

It is characteristic of the invention that each tool half or tool section, in addition to the above means, also supports a pair of clamping jaws to secure an associate film web at a point intermediate the film supply roll and the intended welding point, the tool also comprising means to release the film from the associated clamping jaw pair immediately after or exactly during the pressing together of the two tool sections, said means thereafter initiating the welding together of the film webs. Because of the incorporation in the wrapping machine of a tool equipped in this manner, said machine need not be provided with means arranged to brake or slow up the speed of advancement of the film webs reeled off from the supply rolls or with an apparatus urging the goods into contact with the film webs under tension. Instead, the goods may in accordance with common practice be forwarded on a conveyor towards and into contact with the film positioned in the path of advancement of the goods so as to push away said film which is then made to enclose three sides of the goods, whereupon the tool sections tuck the film around the fourth side of the goods. Before the tool sections are pressed together completely, the film is, however, locked to the two tool sections in such a manner that upon closing of the tool sections the film will be tightened or stretched around the goods. Prior to the welding operation proper the film tension is released in the direction towards the supply rolls whereas the tension in the film enclosing the goods is retained by the means of the tool clamping jaws on the edge of the tool adjacent the goods. It thus becomes possible to weld the film in a tension-free condition to ensure an excellent and durable welding seam.

BRIEF DESCRIPTION OF THE DRAWINGS

Further characteristics of the invention will become apparent upon reading of the following, partly schematical drawings, wherein FIG. 2 illustrates on an enlarged scale a partly broken plan view of a tool in accordance with the invention, FIG. 3 illustrates a horizontal cross sectional view through the tool in accordance with the invention, along line III—III of FIG. 2, the tool being in the position wherein the film forwarded from the supply rolls is locked, FIG. 4 illustrates in a similar cross-sectional view the position of joining together the two tool sections.

DETAILED DESCRIPTION OF A PREFERRED EMBODIMENT

Figure 1:
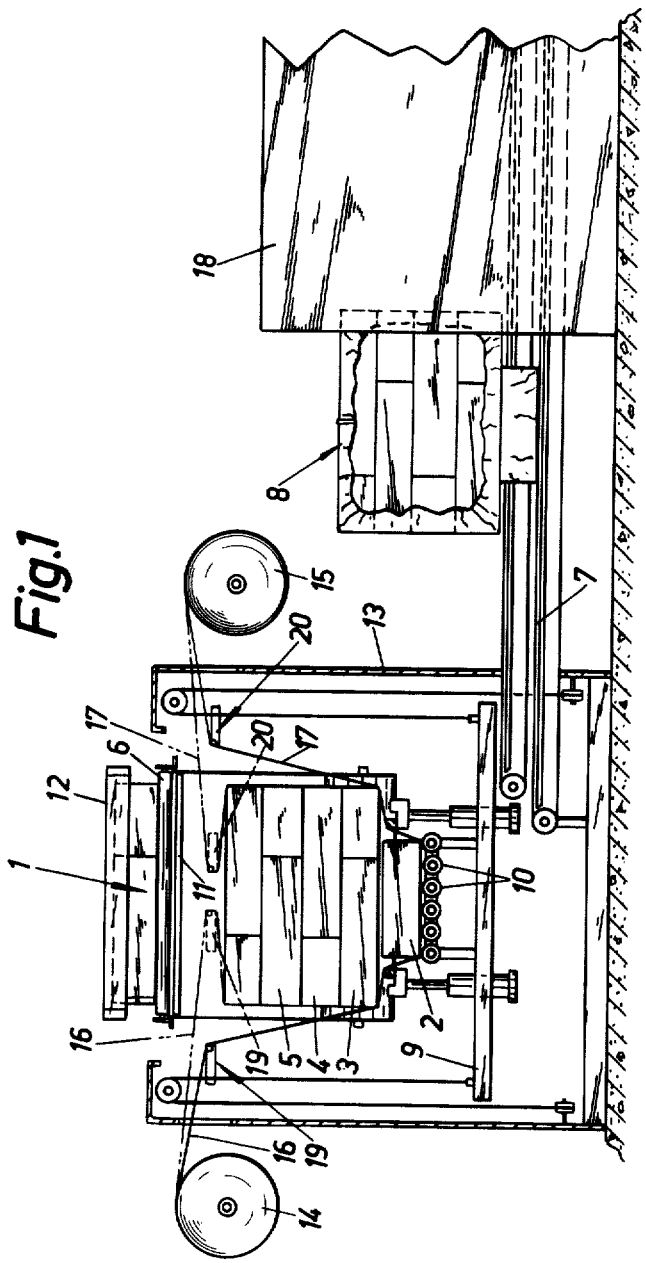
FIG. 1 is a side view of a wrapping machine incorporating a tool in accordance with the invention.
Figure 5:
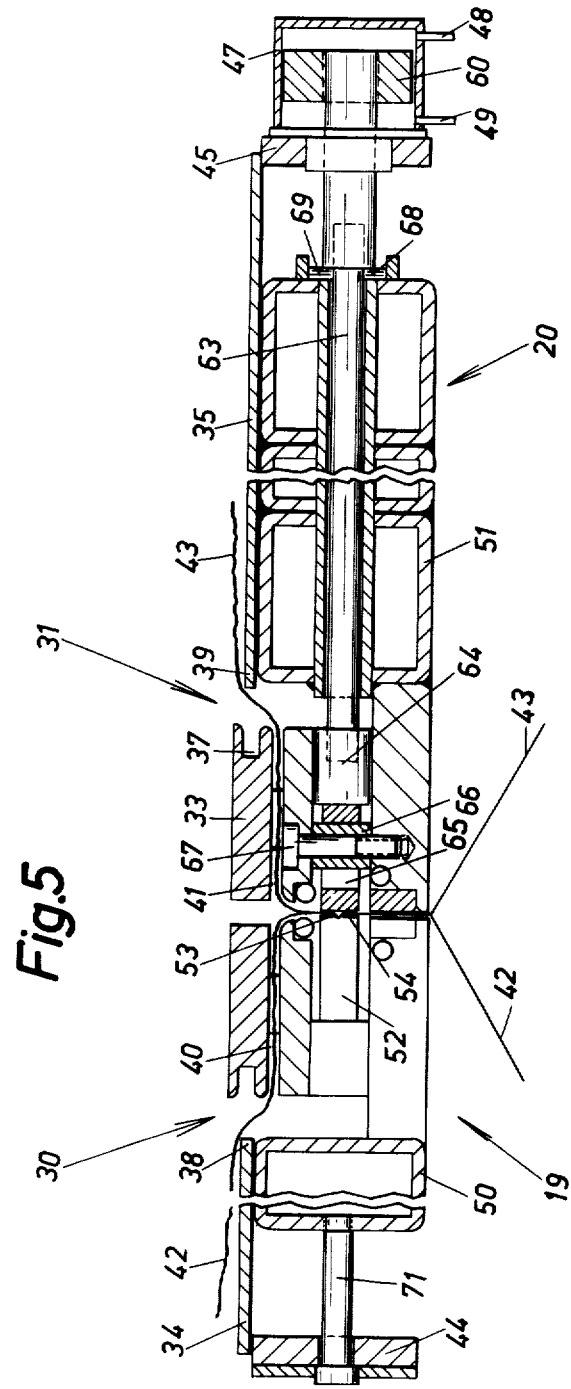
FIG. 5 is a similar section illustrating the position after completion of the welding operation immediately prior to the separation of the two tool sections.

The machine schematically illustrated in FIG. 1 and adapted for stacking and wrapping goods 1 in superposed layers 2, 3, 4, and 5, is provided at its upper part with a conveyor 6 for feeding goods into the machine and at its lower part with a conveyor 7 for discharging from the machine the completed load 8 stacked and wrapped in plactics film. The machine also comprises an elevator carriage 9 and a roller table 10 which may be displaced stepwise from an upper position almost level with the conveyor 6 downwards over a distance corresponding to the height of the respective one of the goods layers 2 to 5. Below the conveyor 6 a feeder plate 11 is arranged for reciprocating movement past a stripper means 12 which is movable in the vertical direction upwards and downwards. In the machine frame 13 are mounted two supply rolls 14, 15 holding weldable plastics film, so-called shrinking foil or stretching foil, the webs 16, 17 of which extend across the mobile roller table 10 at which point the web ends are interconnected by welding. The machine frame 13 may also support an additional two supply rolls (not shown) holding plastics film the webs of which the initial stage extend across the roller table 10 beneath the first-mentioned shrinking film webs 16, 17 crossing the latter at right angles and having their ends interconnected above the roller table. The outlet end of the conveyor 7 extends into a shrinking tunnel 18.

Below the feeder plate 11 are arranged two halves or sections 19, 20 of a tool in accordance with the invention and intended to pull the two film webs 16 and 17 together around the load composed of goods layers 2, 3, 4, and 5 and to weld together these film webs and sever the film along the welding joint or seam. This tool in accordance with the invention is illustrated on an enlarged scale in FIGS. 2 to 5.

The two tool sections 19, 20 are provided at their ends with bearing sleeves 21, 22 by means of which the tool sections are displaceable towards and away from one another on horizontal, mutually parallel rods 23 carried by the machine frame 13. The displacement of the tool sections 19, 20 towards and away from one another is effected by two pairs of piston-and-cylinder units 24, 25 and 26, 27, respectively. Each tool section 19, 20 carries on its forward lower edge a clamping jaw 28, 29 and at its upper edge a clamping jaw pair 30, 31 each such pair consisting of a stationary clamping jaw 32, 33 and second clamping jaw 34, 35 which is mobile relative to the stationary one. The stationary clamping jaw 32, 33 is provided with a groove-like channel 36, 37 wherein the forward edge 38, 39 of the mobile jaw 34, 35 may engage. Between the stationary jaw 32, 33 and the principal portion of the associated tool section 19, 20 there is a gap 40, 41 through which runs the associated film web 42, 43. The mobile jaw 34, 35 is secured at its rear end to a rail 44, 45 extending along the entire tool section 19, 20, said rail carrying one end of a pair of pressure cylinders 46, 47 both ends of which are connected to a (not shown) source of pressure by means of hoses 48, 49. The body 50, 51 of the two tool sections consists of profile tubes extending along the entire tool length and being mutually interconnected through welding. The body 50 carries at its forward edge a preferably heated counter-holding rail 52 for two welding units 53, 54 arranged on tool section 20, and also a severing means 55 positioned between said units. In addition, the two tool sections 19, 20 are provided with tubes 56, 57, 58, 59 connecting them with a source of pressurized cooling air.

The piston rod 61 connected to the piston 60 of the pressure cylinder 47 slidingly passes one end wall 62 of the cylinder and the rail 45 supporting clamping jaw 35. The piston rod 61 is provided with an extension rod 63 which is displaceably mounted in the body 51 and at its forward end secured to a sliding piece 64 which at its forward edge carries the welding jaws 53, 54 and the severing means 55. The sliding piece 64 is formed with elongate holes 65 extending in its direction of displacement and a guide sleeve 66, secured to the frame 51 by a bolt 67, is arranged to pass through each such hole. At its rear edge the frame 51 is provided with resilient means 68 arranged upon displacement of the piston 60 to the left in accordance with FIG. 3, to be compressed by a shoulder 69 formed at the forward end of the piston rod 61.

The cylinders 46 on tool section 19 are arranged approximately in the same manner as the cylinders 47 on tool section 20 and serve to displace the clamping jaw 34 towards and away from the stationary jaw 32. The heads 70 on stopper bolts 71, screwed into the frame 50, serve to limit the displacement outwards (to the left in accordance with FIGS. 3 and 4) of the cylinders 46 and consequently that of the support rail 44 and the clamping jaw 34. The counter-holder rail 52 need not, however, be displaceable like the sliding piece 64.

When the required number of goods layers 2, 3, 4, and 5 have been stacked on top of one another on the roller table 10 pressurized medium is introduced into the cylinders 25, 27 resulting in a displacement of the tool sections 19, 20 towards one another so as to bring the film webs 16, 17 to enclose the stack of goods. When the tool sections 19, 20 reach approximately the position illustrated in FIGS. 1 and 3, pressurized medium is introduced through the tubes 49 into the cylinders 46, 47. The result is that the cylinders 46, 47 are displaced inwards (towards one another) which in turn brings about clamping of the film webs 42, 43 in the grooves 36, 37 in the jaws 32, 33. Upon continued displacement of the tool sections 19, 20 towards one another, see the direction indicated by arrows 72, 73 in FIG. 3, the film is strongly tightened about the stack of goods. When the film webs 42, 43 are compressed by the clamping jaws 28, 29 (FIG. 4) or immediately after, pressurized medium enters the cylinders 46, 47 through the hoses 48. As a consequence, the cylinders 46, 47 together with the support rails 44, 45 and the clamping units 34, 35 are displaced to their outer positions, whereupon the film webs 42, 43 are released from the clamping jaws 32, 34, and 33, 35. As soon as the cylinders 46, 47 have reached their outer positions, limited by the heads 70 on the stopper bolts 71, a pressure increase at the outer end of the cylinder 47 results in displacement of the piston 60 together with its piston rod 61, the extension rod 63 and the sliding piece 64 to the left into the position illustrated in FIG. 5 while compressing the the resilient means 68 (consisting, e.g., of a number of spring washers) with the aid of the shoulder 69. This effects welding together of the film webs 42, 43 and at the same time the webs are separated from one another by the severing means 55 in the longitudinal direction of the welding seam. Upon completion of the welding and severing operations, the pressure at the outer end of the cylinder 47 is reduced and as a result thereof the resilient means 68 is able to displace the piston 60, the piston rod 61, the extension rod 63 and the sliding piece 64 sufficiently far to the right in accordance with FIGS. 3 to 5, for the welding units, 53, 54 to go clear of the film webs 42, 43. At the same time the source of pressurized medium is connected to the jet tubes 56, 57, 58, and 59 whereby air jets are directed to the welding point, cooling the latter. The tool sections 19, 20 return to their original position (FIG. 1) and a fresh stack of goods may be handled. The load 8, enclosed in the plastics film, may be carried on the conveyor 7 through a shrinking tunnel 18 wherein the film is shrunk around the goods.

The embodiment as described and illustrated is to be regarded as an example only and the various details of the tool may be constructively altered in a variety of ways within the scope of the appended claims. With the same advantage, the tool may be used in wrapping machines of the kind indicated in the introduction, viz. the kind wherein the film webs extend vertically and the stack of goods is advanced on a horizontal conveyor towards and into contact with the film positioned in the path of movement of the stack of goods.

The shrinking tunnel 18 may be dispensed with if the film is folded around the corners of the stack of goods and welded together at these points by special welding units.

What I claim is:

1. An improved tool for interconnecting by means of welding two webs of a weldable and preferably also extensible plastics film enclosing a package of goods, said webs being reeled off two separate supply rolls, said tool comprising two tool sections arranged to be pressed against one another, a face on each tool section being positioned adjacent said goods, a clamping jaw on each said section face, two welding units positioned on one of said sections externally of said clamping jaw as seen from the direction of said goods, and a severing means intermediate said welding units, the improvement comprising an additional pair of clamping jaws on each said tool section, said additional clamping jaws arranged to securely clamp the associated film web at a point between the supply roll of the latter and the intended welding point, and also means for releasing said film from said additional two pairs of clamping jaws immediately after or exactly during the joining together of said tool sections, said welding units being arranged to thereafter initiate the welding operation.

2. An improved tool as claimed in claim 1, wherein said clamping jaw pair provided on each said tool section comprises one stationary clamping jaw attached to said tool section and one movable clamping jaw mounted on said tool section for displacement towards and away from said stationary jaw.

3. An improved tool as claimed in claim 2, comprising a slit for passage of said film, said slit provided between said stationary clamping jaw and the principal portion of the associated tool section.

4. An improved tool as claimed in claim 2, comprising a piston cylinder, said movable clamping jaw being connected to one end of said piston cylinder, a source of pressurized medium, both ends of said piston cylinder connected to said source of pressurized medium, the piston rod of said piston cylinder being displaceably mounted in its associated tool section for movement in the direction of displacement of said tool section, a sliding piece displaceably mounted in said tool section and supporting said welding units and said severing means, the free end of said piston rod connected to said sliding piece.

5. An improved tool as claimed in claim 4, comprising a resilient means acting to displace said sliding piece, and a stopper means, said stopper means limiting the distance over which said sliding piece is displaceable through the action of said resilient means to a non-operative position of said welding and severing means.

* * * * *